(12) United States Patent
Osawa

(10) Patent No.: US 9,137,450 B2
(45) Date of Patent: Sep. 15, 2015

(54) IMAGE SENSING APPARATUS, EXPOSURE CONTROL METHOD AND RECORDING MEDIUM

(71) Applicant: CANON KABUSHIKI KAISHA, Tokyo (JP)

(72) Inventor: Toshifumi Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 13/850,730

(22) Filed: Mar. 26, 2013

(65) Prior Publication Data

US 2013/0258175 A1    Oct. 3, 2013

(30) Foreign Application Priority Data

Apr. 2, 2012    (JP) ................. 2012-084066

(51) Int. Cl.
*H04N 5/235* (2006.01)
*G03B 7/00* (2014.01)
*H04N 5/238* (2006.01)
*H04N 5/222* (2006.01)

(52) U.S. Cl.
CPC ........... *H04N 5/2351* (2013.01); *H04N 5/2355* (2013.01); *H04N 5/2356* (2013.01)

(58) Field of Classification Search
USPC .................. 348/229.1, 230.1, 362, 364, 366, 348/370–371; 382/170
See application file for complete search history.

(56) References Cited

U.S. PATENT DOCUMENTS

| | | | |
|---|---|---|---|
| 2009/0021596 A1* | 1/2009 | Izume et al. | 348/222.1 |
| 2010/0110265 A1* | 5/2010 | Akita et al. | 348/333.01 |
| 2011/0298886 A1* | 12/2011 | Price et al. | 348/14.08 |
| 2012/0206640 A1* | 8/2012 | Nakagawara | 348/345 |
| 2012/0257081 A1* | 10/2012 | Mine | 348/229.1 |
| 2013/0002941 A1* | 1/2013 | Park et al. | 348/362 |

FOREIGN PATENT DOCUMENTS

| | | |
|---|---|---|
| JP | 3395770 B | 4/2003 |
| JP | 4054263 B | 2/2008 |

* cited by examiner

*Primary Examiner* — Kelly L Jerabek

(74) *Attorney, Agent, or Firm* — Cowan, Liebowitz & Latman, P.C.

(57) ABSTRACT

An image sensing apparatus obtains the weighted average luminance of an image sensing target that puts weight on a main subject in an obtained luminance distribution of the image sensing target. The image sensing apparatus decides exposure control values based on the average luminance of a region that is lower than the weighted average luminance, out of regions each of a predetermined size contained in the image sensing target, and the weighted average luminance.

19 Claims, 10 Drawing Sheets

F I G. 2
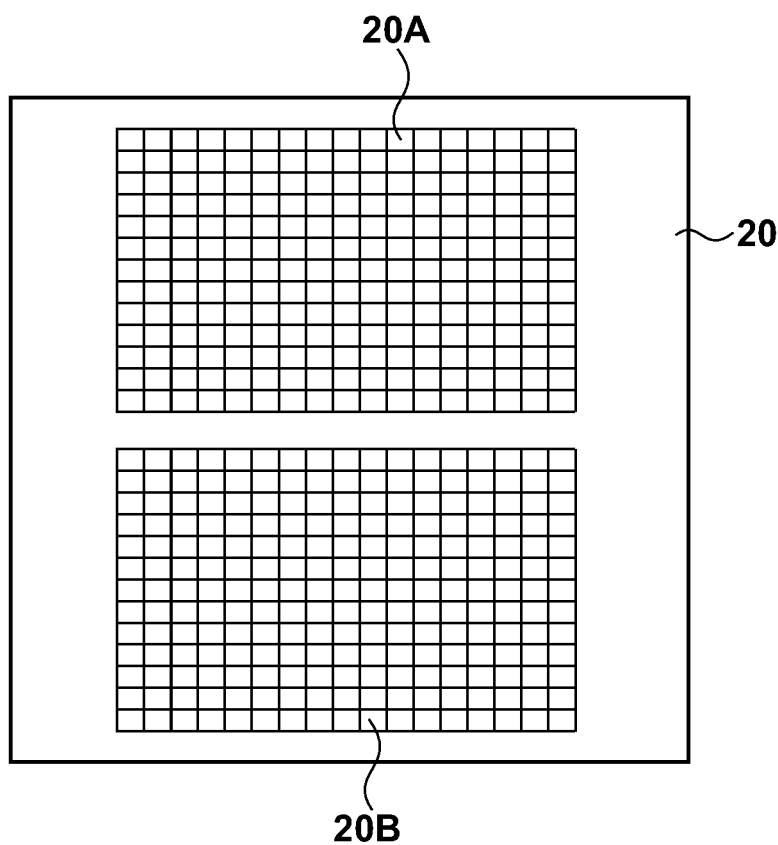

FIG. 9A

| ED₁₁ | ED₁₂ | ED₁₃ | ED₁₄ | ED₁₅ | ED₁₆ | ED₁₇ | ED₁₈ | ED₁₉ | Y1 |
|------|------|------|------|------|------|------|------|------|----|
| ED₂₁ | ED₂₂ | ED₂₃ | ED₂₄ | ED₂₅ | ED₂₆ | ED₂₇ | ED₂₈ | ED₂₉ | Y2 |
| ED₃₁ | ED₃₂ | ED₃₃ | ED₃₄ | ED₃₅ | ED₃₆ | ED₃₇ | ED₃₈ | ED₃₉ | Y3 |
| ED₄₁ | ED₄₂ | ED₄₃ | ED₄₄ | ED₄₅ | ED₄₆ | ED₄₇ | ED₄₈ | ED₄₉ | Y4 |
| ED₅₁ | ED₅₂ | ED₅₃ | ED₅₄ | ED₅₅ | ED₅₆ | ED₅₇ | ED₅₈ | ED₅₉ | Y5 |
| ED₆₁ | ED₆₂ | ED₆₃ | ED₆₄ | ED₆₅ | ED₆₆ | ED₆₇ | ED₆₈ | ED₆₉ | Y6 |
| ED₇₁ | ED₇₂ | ED₇₃ | ED₇₄ | ED₇₅ | ED₇₆ | ED₇₇ | ED₇₈ | ED₇₉ | Y7 |
| X1 | X2 | X3 | X4 | X5 | X6 | X7 | X8 | X9 | |

FIG. 9B

| 1 | 1 | 2 | 2  | 2  | 2 | 2 | 1 | 1 |
|---|---|---|----|----|---|---|---|---|
| 1 | 1 | 2 | 4  | 4  | 4 | 2 | 1 | 1 |
| 1 | 1 | 2 | 4  | 8  | 4 | 2 | 1 | 1 |
| 1 | 1 | 2 | 8  | 12 | 8 | 2 | 1 | 1 |
| 1 | 1 | 2 | 4  | 8  | 4 | 2 | 1 | 1 |
| 1 | 1 | 2 | 4  | 4  | 4 | 2 | 1 | 1 |
| 1 | 1 | 2 | 2  | 2  | 2 | 2 | 1 | 1 |

| 8.75  | 9.125 | 9.25  | 9.125 | 9.125 | 9     | 9.25  | 9.25  | 8.75  | 9.125 |
| 8.875 | 9.25  | 8.75  | 8.125 | 8.5   | 9.125 | 9.25  | 9.25  | 9.125 | 8.75  |
| 9     | 9.25  | 8.25  | 6.25  | 8.25  | 9.125 | 9.125 | 9.125 | 9     | 8.125 |
| 9.125 | 9.25  | 7.75  | 4.125 | 7.75  | 9     | 8.875 | 9.125 | 9     | 7.5   |
| 9.125 | 8.75  | 7.25  | 4.25  | 7     | 8.25  | 8.75  | 8.875 | 8.875 | 7.5   |
| 8.25  | 7.375 | 6.5   | 4.125 | 6.75  | 8.25  | 7.375 | 7.375 | 8.25  | 6.5   |
| 6.25  | 6.125 | 5.875 | 4     | 5     | 5.875 | 6     | 6.125 | 6     | 5.25  |
| 8.375 | 8.375 | 7.75  | 5.625 | 7.625 | 8.375 | 8.375 | 8.375 | 8.375 |       |

F I G. 11
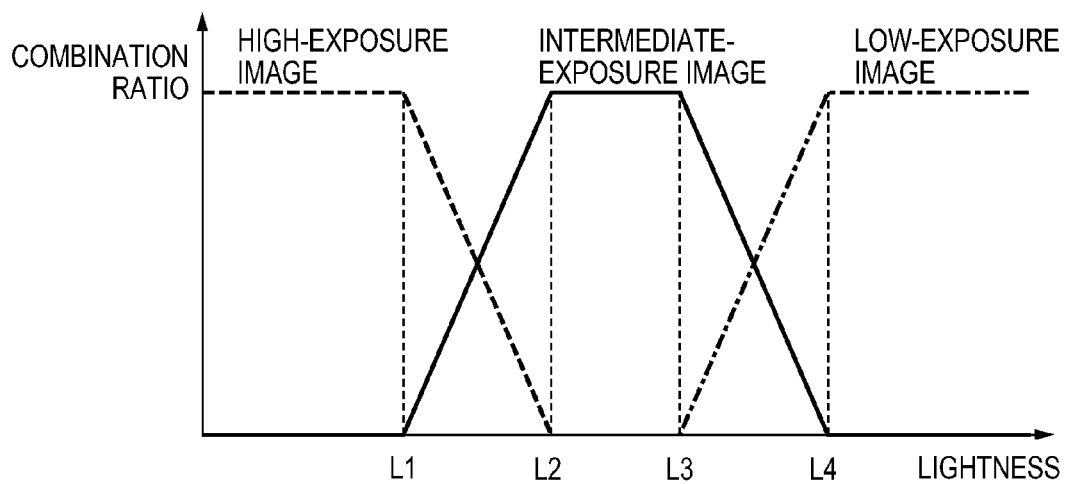
F I G. 12
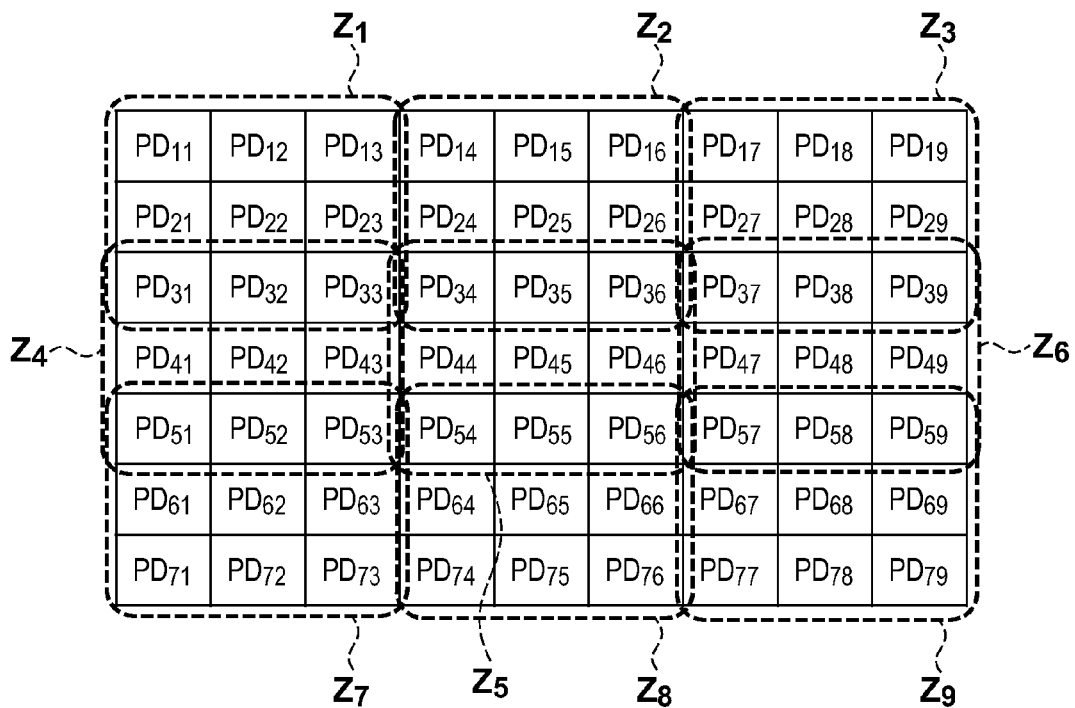

IMAGE SENSING APPARATUS, EXPOSURE CONTROL METHOD AND RECORDING MEDIUM

BACKGROUND OF THE INVENTION

1. Field of the Invention

The present invention relates to an image sensing apparatus, exposure control method, and recording medium, and particularly to an exposure control technique in the image sensing apparatus.

2. Description of the Related Art

An image sensing apparatus such as a digital camera performs image sensing by using exposure settings decided in accordance with an image sensing condition (scene) and a subject. In general, the image sensing apparatus uses the luminance value of a main subject as a reference and decides, as exposure settings, exposure control values such as the shutter speed, aperture value, and sensitivity for obtaining a correct exposure.

One scene where it is difficult to set exposure is a backlight scene. In the backlight scene, the luminance of a main subject is low and that of the background is high. At this time, if exposure settings are decided to correctly expose a main subject, and then an image is sensed, the main subject serving as a dark portion is sensed without blocked up shadows, but blown out highlights may occur in the background. To prevent this, there is an image sensing apparatus capable of outputting an image in which subjects are correctly exposed as a whole in an image sensing condition in which bright and dark portions exist in the image sensing range, like a backlight scene.

Japanese Patent No. 4054263 discloses a technique of combining two types of images obtained at different exposures by using an image sensor including light-receiving elements of different sensitivities, thereby outputting an image in which both bright and dark portions are sensed at correct exposures. Japanese Patent No. 3395770 discloses a technique of sensing a plurality of images at different exposure amounts by time division, and combining them, thereby outputting a tone expression-enhanced image.

To output a tone expression-enhanced image by combining images obtained at different exposure settings, as in Japanese Patent Nos. 4054263 and 3395770, it is necessary to appropriately make exposure settings for the respective images to be combined. The exposure settings are preferably correct for a main subject. For example, in a backlight scene, the exposure settings of a high-exposure image having a large exposure amount are decided to correctly expose a main subject present at a dark portion.

However, the main subject may be erroneously recognized owing to the composition or the like in image sensing, and a subject of the user's choice, which should be selected as a main subject, may not be correctly exposed in an image sensing result obtained at decided exposure settings. For example, in a backlight scene, an image in which an original main subject suffers blocked up shadows may be obtained at exposure settings decided when a subject brighter than the original main subject among subjects present at a dark portion is recognized as a main subject.

SUMMARY OF THE INVENTION

The present invention has been made to solve the conventional problems. The present invention provides an image sensing apparatus, exposure control method, and recording medium which perform exposure control to preferably expose a main subject in backlight.

The present invention in its first aspect provides an image sensing apparatus comprising: an obtaining unit configured to obtain information about a luminance distribution of an image sensing target; a weighted average unit configured to obtain a weighted average luminance of the image sensing target, that puts weight on a main subject, from the information about the luminance distribution of the image sensing target obtained by the obtaining unit; and a decision unit configured to decide an exposure control value based on an average luminance of a region that is lower than the weighted average luminance, out of regions each of a predetermined size contained in the image sensing target, and the weighted average luminance.

Further features of the present invention will become apparent from the following description of exemplary embodiments (with reference to the attached drawings).

BRIEF DESCRIPTION OF THE DRAWINGS

FIG. 2 is a view for explaining the structure of a focus detection sensor 20 according to the embodiment of the present invention;

FIGS. 9A and 9B are views for explaining a projection luminance value calculation method and weighting value distribution according to the embodiment of the present invention;

FIG. 11 is a graph for explaining a combination method for a combined image which is output when a backlight scene image sensing mode is set in the digital camera 100 according to the embodiment of the present invention; and FIG. 12 is a view for explaining a block division luminance value calculation method according to the embodiment of the present invention.

DESCRIPTION OF THE EMBODIMENTS

Exemplary embodiments of the present invention will now be described in detail with reference to the accompanying drawings. The following embodiments will explain an example of applying the present invention to, as an example of an image sensing apparatus, a so-called lens-interchangeable single-lens reflex digital camera in which a backlight scene image sensing mode is prepared in advance. However, the present invention is applicable to an arbitrary device capable of detecting that the image sensing target is a backlight scene.

<<Arrangements of Digital Camera 100 and Interchangeable Lens 200>>

Figure 1:
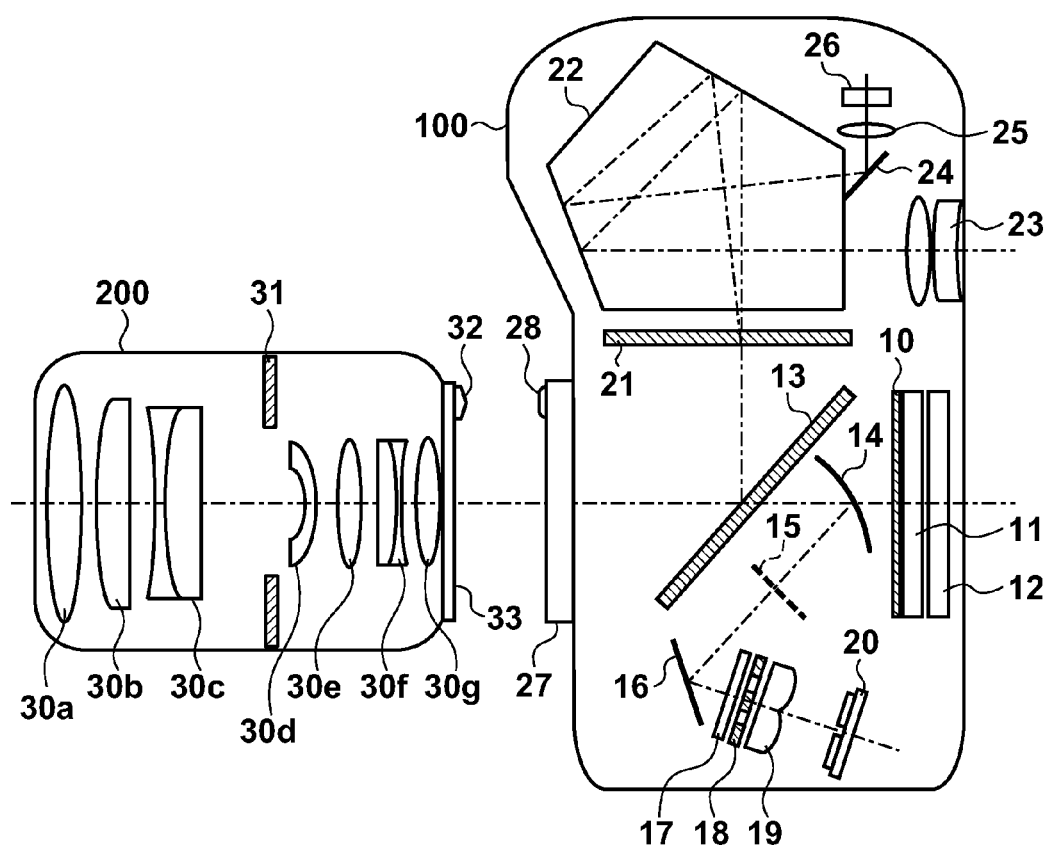
FIG. 1 is a view showing the arrangements of a digital camera 100 and interchangeable lens 200 according to an embodiment of the present invention.

FIG. 1 is a view showing the arrangements of a digital camera 100 and interchangeable lens 200 according to the embodiment of the present invention. Note that members such as a circuit and optical member driving motor are not illustrated in the arrangements of the digital camera 100 and interchangeable lens 200 in FIG. 1.

<Arrangement of Digital Camera 100>

As shown in FIG. 1, light entering the digital camera 100 via the interchangeable lens 200 forms an image on an image sensor 12 via a mechanical shutter 10 and optical low-pass filter 11. The image sensor 12 is, for example, a CCD sensor or CMOS sensor, and is configured by two-dimensionally arranging charge-accumulation type photoelectric converters.

A main mirror 13 and first reflecting mirror 14 are arranged on the optical axis. When forming an optical image on the image sensor 12, these optical members are moved and retracted from the optical axis.

The main mirror 13 is a so-called semitransparent half mirror. Light reflected by the main mirror 13 is diffused by a focusing plate 21, and enters a pentaprism 22. The pentaprism 22 reflects the incident diffused beam, and the beam then reaches an eyepiece lens 23 serving as an optical viewfinder, and a photometry sensor 26 which measures the luminance distribution of an image sensing target.

Figure 3:
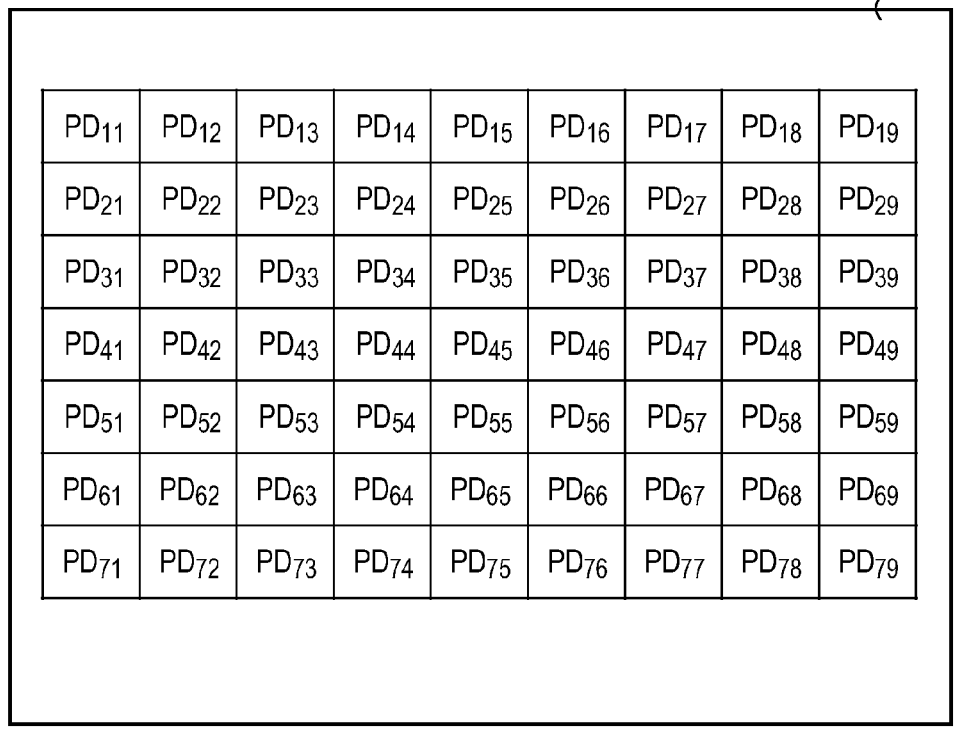
FIG. 3 is a view for explaining the structure of a photometry sensor 26 according to the embodiment of the present invention.

The photometry sensor 26 is, for example, a CCD sensor or CMOS sensor, and is configured by two-dimensionally arranging charge-accumulation type photoelectric converters, similar to the image sensor 12. In the embodiment, the photometry sensor 26 can divide a two-dimensional region corresponding to an image sensing target into a plurality of regions as shown in FIG. 3, and output subject luminance information corresponding to each region. In addition to the photoelectric converters, the photometry sensor 26 includes a signal amplifier circuit, signal processing circuit, and the like which are formed as an integrated circuit on a single chip. In the embodiment, the photometry sensor 26 outputs pieces of subject luminance information for 7×9=63 divided photometry areas $PD_{11}$ to $PD_{79}$. However, the region division number is not limited to this. A beam to enter the photometry sensor 26 is refracted by a third reflecting mirror 24, condensed by a condenser lens 25, and then enters the photometry sensor 26. Instead of the photometry sensor 26, the image sensor 12 may be configured to divide a two-dimensional region corresponding to an image sensing target into a plurality of regions as shown in FIG. 3, and output subject luminance information corresponding to each region.

Light reflected by the first reflecting mirror 14 is refracted by a second reflecting mirror 16 arranged far from a paraxial imaging plane 15 serving as the optical conjugate position of the image sensor 12, and then forms an image on a focus detection sensor 20 via an infrared cut filter 17, stop 18, and secondary imaging lens 19.

Figure 4:
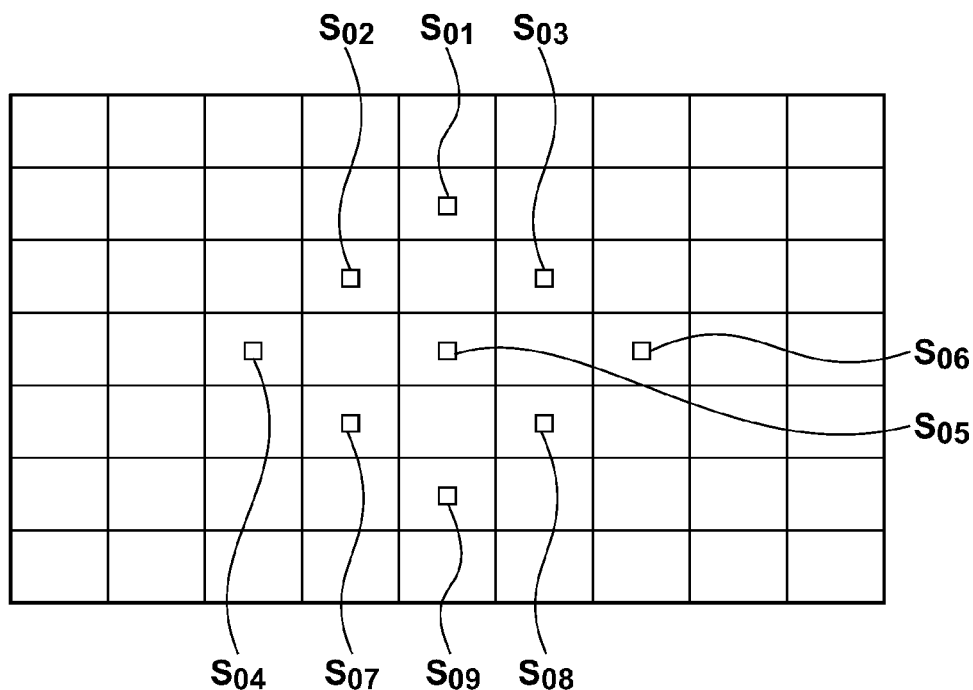
FIG. 4 is a view for explaining a distance measurement area according to the embodiment of the present invention.

The focus detection sensor 20 is, for example, a CCD sensor or CMOS sensor, and is configured by two-dimensionally arranging charge-accumulation type photoelectric converters, similar to the image sensor 12 and photometry sensor 26. In the embodiment, the focus detection sensor 20 is formed from two types of photoelectric converter groups 20A and 20B, as shown in FIG. 2. The stop 18 has two apertures, and beams having passed through the respective apertures form images on the photoelectric converter groups 20A and 20B via the secondary imaging lens 19. The focus detection sensor 20 detects the degree of focusing in a preset distance measurement area based on the relative position shift amount between images output from the photoelectric converter groups 20A and 20B. As the preset distance measurement area, the embodiment sets, for example, nine regions $S_{01}$ to $S_{09}$ out of regions corresponding to the divided photometry areas of the photometry sensor 26, as shown in FIG. 4. In the example of FIG. 4, $S_{01}$ corresponds to $PD_{25}$, $S_{02}$ corresponds to $PD_{34}$, $S_{03}$ corresponds to $PD_{36}$, $S_{04}$ corresponds to $PD_{43}$, $S_{05}$ corresponds to $PD_{45}$, $S_{06}$ corresponds to $PD_{47}$, $S_{07}$ corresponds to $PD_{54}$, $S_{08}$ corresponds to $PD_{56}$, and $S_{09}$ corresponds to $PD_{65}$. In addition to the photoelectric converters, the focus detection sensor 20 includes a signal accumulation circuit, signal processing circuit, and the like which are formed as an integrated circuit on a single chip.

In addition, the digital camera 100 includes a mount 27 for mounting the interchangeable lens 200, and a contact 28 for information communication with a circuit of the interchangeable lens 200.

<Arrangement of Interchangeable Lens 200>

As shown in FIG. 1, the interchangeable lens 200 includes various optical lenses 30a to 30g. In addition to the optical lenses 30, the interchangeable lens 200 includes a stop 31, a contact 32 for information communication with a circuit of the digital camera 100, and a mount 33 corresponding to the mount 27 of the digital camera 100.

<<Functional Arrangements of Digital Camera 100 and Interchangeable Lens 200>>

Figure 5:
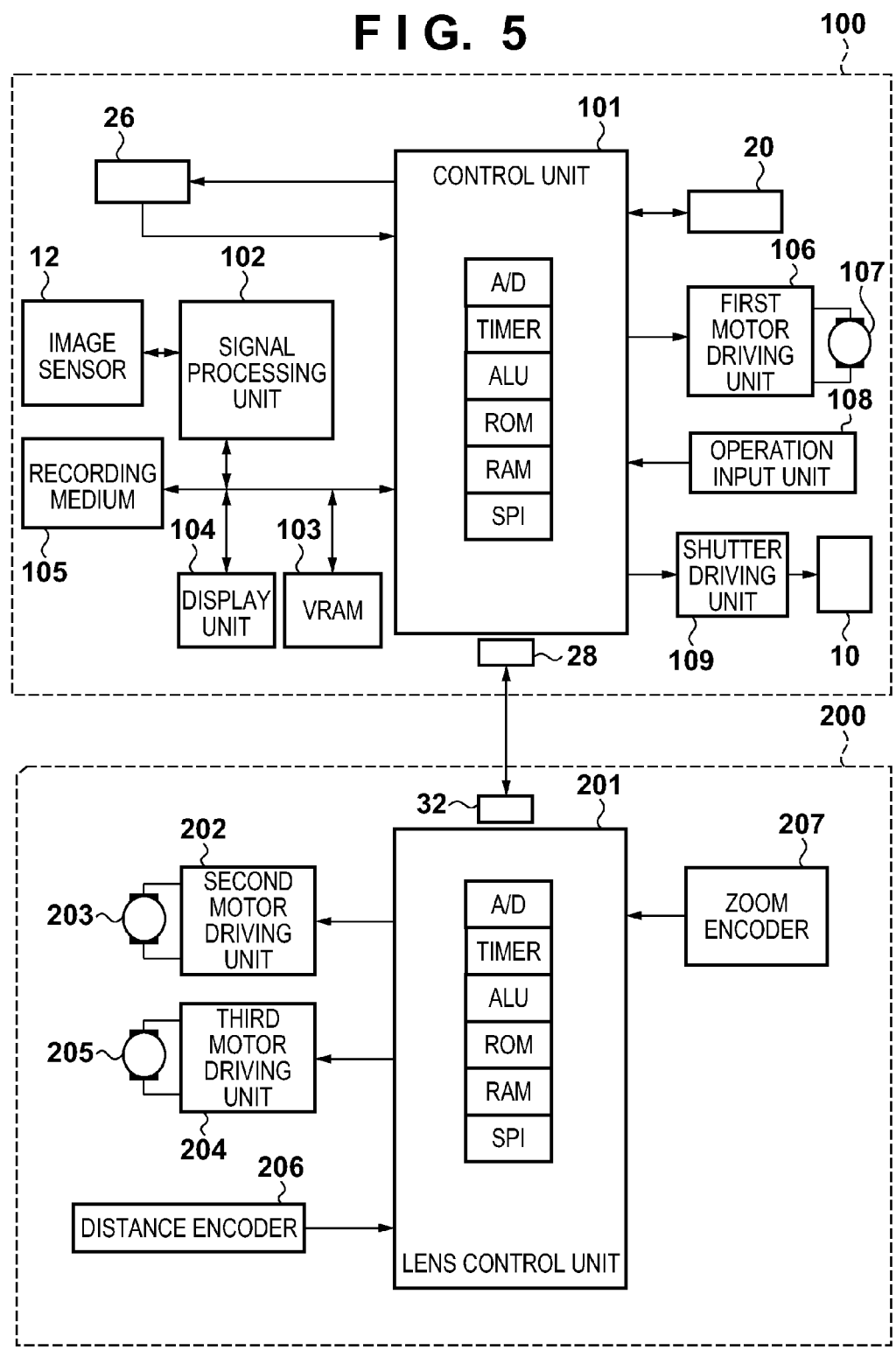
FIG. 5 is a block diagram showing the functional arrangements of the digital camera 100 and interchangeable lens 200 according to the embodiment of the present invention.

The functional arrangements of the digital camera 100 and interchangeable lens 200 will be further explained in detail with reference to FIG. 5.

<Functional Arrangement of Digital Camera 100>

A control unit 101 is a one-chip microcomputer including an ALU, ROM, RAM, A/D converter, timer, and serial communication port (SPI), and controls the operation of each block of the digital camera 100. More specifically, the control unit 101 controls the operation of each block by reading out the operation program of image sensing processing (to be described later) stored in the built-in ROM, expanding it in the built-in RAM, and executing it. In the embodiment, the A/D converter of the control unit 101 is connected to the focus detection sensor 20 and photometry sensor 26, and converts output signals from these sensors into digital data. The SPI of the control unit 101 is connected to the contact 28, and information communication with a lens control unit 201 (to be described later) of the interchangeable lens 200 that is connected via the contacts 28 and 32 is performed by serial communication.

A signal processing unit 102 performs various signal processes in the digital camera 100. More specifically, the signal processing unit 102 applies A/D conversion processing to an analog image signal output by photoelectrically converting an optical image by the image sensor 12, and outputs a digital image signal. When an image signal recording instruction is input, the signal processing unit 102 applies encoding processing or the like complying with a preset encoding method, and outputs an encoded image data signal. In the embodiment, in image sensing in a backlight scene, the signal processing unit 102 performs image combination processing to combine a plurality of images obtained at different exposure amounts, and outputs a so-called HDR image (combined image) in which the reproduction range covers a wider luminance range from bright to dark portions in an image sensing target.

A VRAM 103 is, for example, a DRAM, and is used as a working memory for signal processing in the signal processing unit 102 or a temporary storage area for an image signal to be displayed on a display unit 104.

The display unit 104 is a display device such as an LCD in the digital camera 100. The display unit 104 displays an image obtained by image sensing, and an image sensing signal in the live view mode.

A recording medium 105 is a recording device detachably connected to the digital camera 100, such as a nonvolatile built-in memory (for example, a flash memory), memory card, or HDD in the digital camera 100. The recording medium 105 stores, as an image file, image data obtained by applying encoding processing in the signal processing unit 102.

A first motor driving unit 106 controls to drive a first motor 107. The first motor 107 is a motor for moving the main mirror 13 and first reflecting mirror 14 to be arranged on the optical axis and retracted from it, and for changing the mechanical shutter 10 to the shutter charging state. The first motor driving unit 106 under the control of the control unit 101 controls to drive the first motor 107.

An operation input unit 108 is a user interface in the digital camera 100, including a release switch and mode selection switch. When the operation input unit 108 detects that the user has operated the user interface, it outputs a corresponding control signal to the control unit 101.

A shutter driving unit 109 opens and closes, in accordance with a control signal output from the control unit 101, the mechanical shutter 10 set in the shutter charging state by the first motor 107, and exposes the image sensor 12 for a time defined by the shutter speed.

<Functional Arrangement of Interchangeable Lens 200>

Similar to the control unit 101, the lens control unit 201 is a one-chip microcomputer including an ALU, ROM, RAM, A/D converter, timer, and serial communication port (SPI), and controls the operation of each block of the interchangeable lens 200. More specifically, the lens control unit 201 controls the operation of each block by reading out the operation program of the block that is stored in the built-in ROM, extracting it in the built-in RAM, and executing it. In the embodiment, the A/D converter of the lens control unit 201 is connected to a distance encoder 206 and zoom encoder 207, and converts output signals from these encoders into digital data. Note that the distance encoder and zoom encoder may receive digital signal inputs such as gray code pattern signals. The SPI of the lens control unit 201 is connected to the contact 32, and information communication with the control unit 101 of the digital camera 100 that is connected via the contacts 32 and 28 is performed by serial communication.

A second motor driving unit 202 controls to drive a second motor 203. The second motor 203 is a motor for driving a focus lens pertaining to a focusing operation out of the optical lenses 30. When the lens control unit 201 receives a focusing operation instruction from the control unit 101, it gives a focusing lens driving instruction to the second motor driving unit 202 in accordance with the instruction, thereby driving the second motor 203. The distance encoder 206 detects information of the current position of the focus lens. The distance encoder 206 outputs a focus lens extension amount to the lens control unit 201.

A third motor driving unit 204 controls to drive a third motor 205. The third motor 205 is a motor for opening and closing the stop 31. When the lens control unit 201 receives information of an aperture value to be set from the control unit 101, it gives a stop opening/closing instruction to the third motor driving unit 204 in accordance with the instruction, thereby driving the third motor 205.

The zoom encoder 207 detects information of the current position of the zoom lens that pertains to a zoom state set by the user. The zoom encoder 207 outputs a zoom lens extension amount to the lens control unit 201.

<Image Sensing Sequence>

An image sensing sequence to be executed when the control unit 101 receives, from the operation input unit 108, a control signal representing that the user has issued an image sensing instruction in the digital camera 100 having the above arrangement according to the embodiment will be explained.

First, the control unit 101 outputs a control signal to the first motor driving unit 106 to control to drive the first motor 107, flip up the main mirror 13 and first reflecting mirror 14, and retract them from the optical path.

Then, the control unit 101 transmits information of the aperture value out of decided exposure settings to the lens control unit 201 of the interchangeable lens 200 via the contact 28. In accordance with the received aperture value information, the lens control unit 201 controls the third motor driving unit 204 to drive the third motor 205, and controls the opening/closing state of the stop 31.

When it is detected that an image sensing instruction has been issued, the control unit 101 transmits a control signal to the shutter driving unit 109 to open the mechanical shutter 10 by a time (accumulation time) defined by the shutter speed out of the decided exposure settings, and expose the image sensor 12. At this time, the control unit 101 controls the operation of the signal processing unit 102 to perform accumulation in the image sensor 12 by the accumulation time using a readout gain defined by the sensitivity out of the decided exposure settings.

Upon the lapse of the accumulation time, the control unit 101 transmits a full-aperture instruction to the lens control unit 201 via the contact 28 to change the stop 31 from the stop-down state to the full-aperture state. Upon receiving the full-aperture instruction, the lens control unit 201 outputs a control signal corresponding to the full-aperture instruction to the third motor driving unit 204 to drive the third motor 205 and change the stop 31 to the full-aperture state. Also, the control unit 101 outputs a control signal to the first motor driving unit 106 to control to drive the first motor 107, insert again the main mirror 13 and first reflecting mirror 14 in the optical path, and perform mechanical charging of the mechanical shutter 10.

Upon the lapse of the accumulation time, the signal processing unit 102 reads out charges accumulated in the image sensor 12, and applies A/D conversion processing and various correction or interpolation processes to them. The signal processing unit 102 also applies white balance adjustment processing to the processed image signal under the control of the control unit 101. More specifically, the signal processing unit 102 divides one frame into a plurality of regions, and extracts the white region of the subject based on the color difference signals of the respective regions. Further, the signal processing unit 102 performs white balance adjustment processing by correcting the gains of the red and blue channels of the entire frame based on the signal of the extracted region.

The control unit 101 controls the signal processing unit 102 to apply encoding processing of the recording file format to the image signal having undergone white balance adjustment processing. Then, the control unit 101 stores the obtained image data as an image file in the recording medium 105.

<<Image Sensing Processing>>

Figure 6:
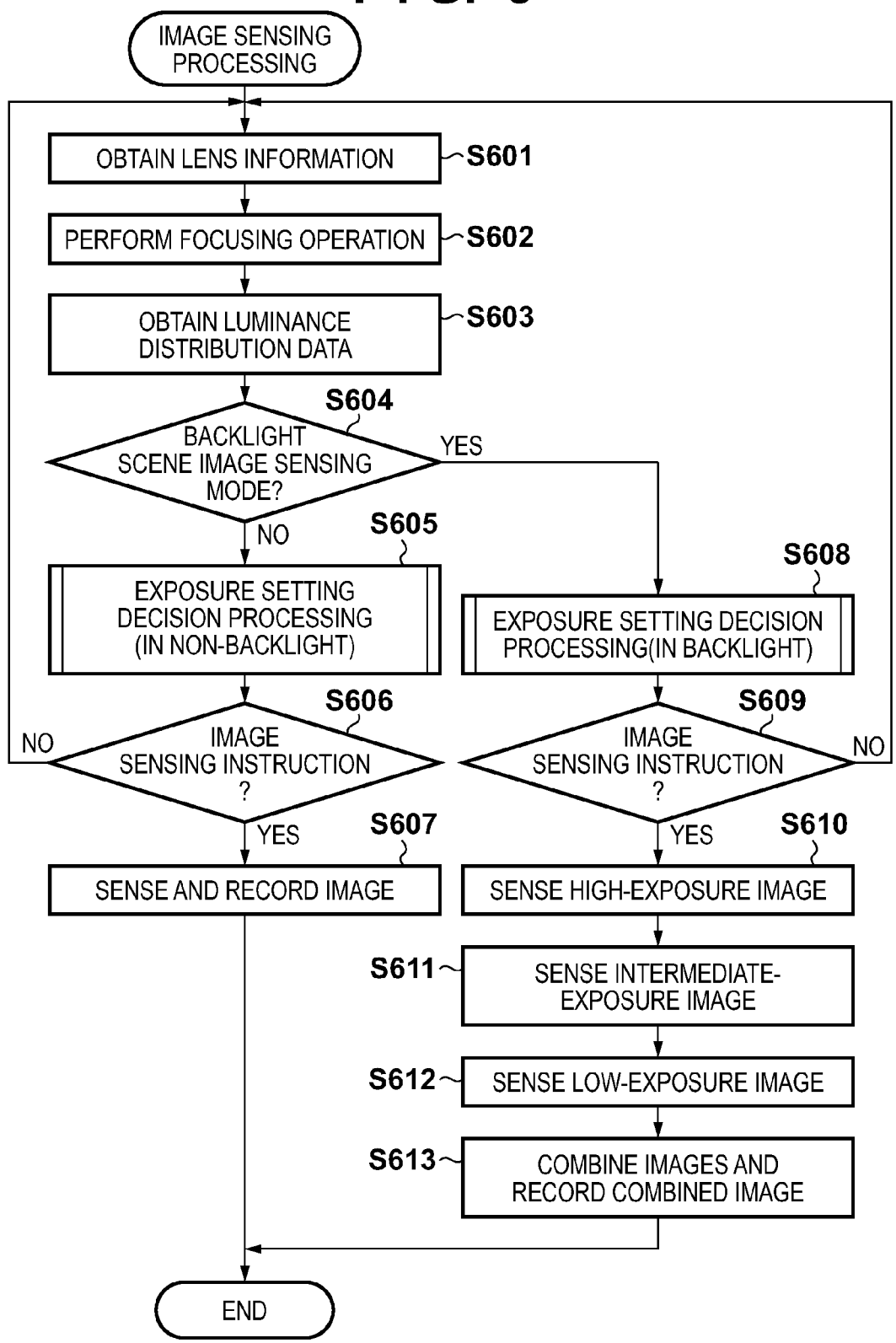
FIG. 6 is a flowchart exemplifying image sensing processing to be executed by the digital camera 100 according to the embodiment of the present invention.

Next, image sensing processing by the digital camera 100 according to the embodiment will be explained in detail with reference to the flowchart of FIG. 6. Processing corresponding to the flowchart can be implemented when, for example, the control unit 101 reads out a corresponding processing program stored in the ROM, extracts it, and executes it. In the following description, the image sensing processing starts when, for example, the digital camera 100 is activated.

In step S601, the control unit 101 obtains current setting information (lens information) of the interchangeable lens 200. More specifically, the control unit 101 transmits a lens information obtaining request to the lens control unit 201 of the interchangeable lens 200 via the contact 28. Upon receiving the lens information obtaining request, the lens control unit 201 obtains information of the current driving positions of the focus lens and zoom lens from the distance encoder 206 and zoom encoder 207, and transmits it as lens information to the control unit 101 via the contact 32. Upon receiving the lens information, the control unit 101 stores it in the RAM.

In step S602, the control unit 101 decides, as a region of interest, a distance measurement area to be focused among the preset distance measurement areas $S_{01}$ to $S_{09}$, and controls the interchangeable lens 200 to focus on a subject contained in the area. More specifically, the control unit 101 outputs a control signal to the focus detection sensor 20 to start a signal accumulation operation. Upon the lapse of the accumulation period, the control unit 101 reads out focus detection data (two types of two-dimensional image data) from the focus detection sensor 20. Assume that the control unit 101 applies A/D conversion processing and correction processing such as shading to the focus detection data. A distance measurement area to be focused among the preset distance measurement areas may be set in advance for the image sensing mode or set arbitrarily by the user. In the embodiment, one of the preset distance measurement areas is decided as a distance measurement area to be focused, but it will be readily understood that the distance measurement area to be focused is not limited to this.

The control unit 101 obtains, from the focus detection data of the distance measurement area to be focused, the defocus amount of an image contained in this area. Based on the obtained defocus amount information, the control unit 101 calculates the moving amount of the focus lens which is to focus on the distance measurement area to be focused, and transmits it to the lens control unit 201 of the interchangeable lens 200 via the contact 28 together with a focus lens driving instruction. Upon receiving the focus lens driving instruction, the lens control unit 201 transmits the simultaneously received focus lens moving amount information to the second motor driving unit 202. Upon receiving the focus lens moving amount, the second motor driving unit 202 controls to drive the second motor 203 and move the focus lens by the moving amount.

At this time, the setting information of the interchangeable lens 200 is updated because of the movement of the focus lens. The control unit 101 receives the lens information after the movement of the focus lens from the interchangeable lens 200 via the contact 28.

In step S603, the control unit 101 obtains photometric values (luminance distribution data $ED_{11}$ to $ED_{79}$ corresponding to the divided photometry areas $PD_{11}$ to $PD_{79}$) of the image sensing target as information about the luminance distribution of the image sensing target. More specifically, the control unit 101 starts a signal accumulation operation by outputting a control signal to the photometry sensor 26, and upon the lapse of the accumulation period, sequentially reads out accumulated signals from the photometry sensor 26. The control unit 101 applies A/D conversion processing to the accumulated signals read out from the photometry sensor 26, and stores the obtained data as the photometric values of the photometry regions in the RAM.

In step S604, the control unit 101 determines whether a backlight scene image sensing mode has been set currently in the digital camera 100. More specifically, by referring to information of a currently set image sensing mode that is stored in the ROM, the control unit 101 determines whether the backlight scene image sensing mode has been set. Note that the information of the currently set image sensing mode is changed when the operation input unit 108 detects the state of the mode selection switch upon activation of the digital camera 100 or detects that the user has operated the mode selection switch. That is, upon receiving information of a set mode selection switch state from the operation input unit 108, the control unit 101 changes the information of the currently set image sensing mode that is stored in the ROM. If the control unit 101 determines that the backlight scene image sensing mode has been set, it shifts the process to step S608; if it determines that the backlight scene image sensing mode has not been set, to step S605.

In this step, whether to perform backlight scene processing is determined based on whether the backlight scene image sensing mode has been set. However, determination of whether to execute backlight scene processing is not limited to this. For example, in this step, the control unit 101 may determine whether the current scene is a backlight scene, by a known scene determination technique based on the luminance distribution of an image sensing target. That is, the control unit 101 may calculate the luminance difference between a frame central portion serving as the foreground (main subject) and a peripheral portion serving as the background, the luminance difference between an in-focus region in auto focus and the remaining region, or the like, and determine whether the current scene is a backlight scene.

In step S605, the control unit 101 executes exposure setting decision processing (in non-backlight), and decides exposure settings including the shutter speed, aperture value, and sensitivity used when an image sensing instruction is issued.

<Exposure Setting Decision Processing (in Non-Backlight)>

Figure 7:
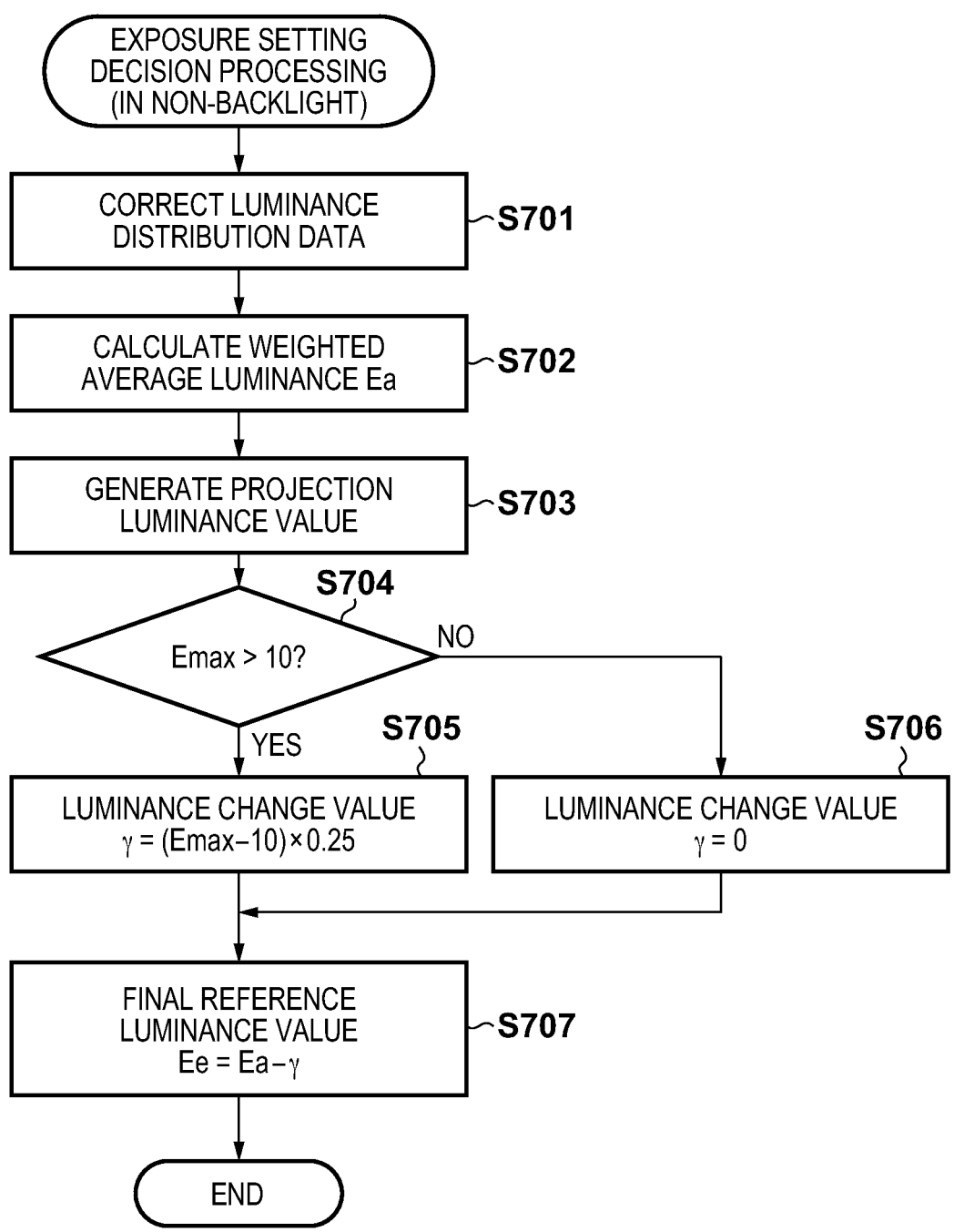
FIG. 7 is a flowchart exemplifying exposure setting decision processing (in non-backlight) to be executed by the digital camera 100 according to the embodiment of the present invention.

The exposure setting decision processing (in non-backlight) to be executed by the digital camera 100 according to the embodiment will be explained in detail with reference to the flowchart of FIG. 7.

In step S701, the control unit 101 corrects, in accordance with the lens information, the luminance distribution data $ED_{11}$ to $ED_{79}$ of the image sensing target that have been obtained in step S603 of image sensing processing. More specifically, the control unit 101 corrects the luminance distribution data by applying level correction processing based on the current f-number of the stop 31, correction processing for light falloff at the lens periphery, and the like.

In step S702, the control unit 101 calculates a weighted average luminance Ea (first average luminance value) that puts weight on an in-focus subject.

More specifically, the control unit 101 first obtains focus detection data from the focus detection sensor 20, and obtains defocus amounts in the distance measurement areas $S_{01}$ to $S_{09}$. Then, the control unit 101 decides weighting values w(x, y) for respective areas corresponding to the photometry areas in the entire image sensing target. In the embodiment, the calculation of the weighted average luminance Ea uses a distribution obtained by changing values in accordance with the defocus amounts of the respective distance measurement areas in the distribution of the default weighting values w(x, y) which put weight on the central portion of the image sensing range, as shown in FIG. 9B. More specifically, the control unit 101 increases, to about 10 to 12, weighting values corresponding to the distance measurement areas $S_{01}$ to $S_{09}$ in the default weighting value distribution when corresponding distance measurement areas are considered to be in the in-focus state, and decreases them to about 1 or 2 when they are considered not to be in the in-focus state. With this setting, even when a main subject does not exist at the center though the central portion is weighted by default, the weighting value for an in-focus region can be increased to raise the degree of influence on the weighted average luminance Ea. That is, this can increase the possibility of calculating a weighted average luminance which increases a weighting value for the region of the main subject.

The control unit 101 obtains the weighted average luminance Ea by weighting and averaging luminance distribution data in accordance with the thus-decided weighting value distribution. That is, the control unit 101 calculates $$Ea = \frac{\sum_x \sum_y (w(x, y) \times ED_{xy})}{\sum_x \sum_y w(x, y)}$$

and can obtain the weighted average luminance Ea which puts weight on an in-focus subject.

In this step, the control unit 101 calculates a luminance value serving as a reference (reference luminance value) by weighted averaging which puts weight on at least an in-focus subject, in order to decide, preferentially for a predetermined region and in-focus region, exposure settings at which an image sensing target is correctly exposed.

In step S703, the control unit 101 generates the projection luminance value of a one-dimensional projection from the corrected luminance data based on the two-dimensional arrangement of the regions in the photometry sensor 26. More specifically, the control unit 101 generates the projection luminance values of each row and each column by calculating average luminances for the regions of each row and each column in the two-dimensional arrangement of the regions in the photometry sensor 26. More specifically, the projection luminance values $X_m$ and $Y_n$ (m is a column number and n is a row number) of each column and each row can be calculated by $$X_m = \frac{1}{7}\sum_{k=1}^{7} ED_{km}$$

$$Y_n = \frac{1}{9}\sum_{k=1}^{9} ED_{nk}$$

Note that each projection luminance value and luminance distribution data have a correspondence as shown in FIG. 9A. For example, X2 is the average value of $ED_{12}$, $ED_{22}$, $ED_{22}$, $ED_{42}$, $ED_{52}$, $ED_{62}$, and $ED_{72}$.

In step S704, the control unit 101 determines whether a maximum projection luminance value Emax among the projection luminance values generated in step S703 exceeds a predetermined luminance (for example, exceeds a By value of 10 which represents brightness in the APEX system). If the control unit 101 determines that the maximum projection luminance value Emax exceeds the By value of 10, it shifts the process to step S705; if it determines that the maximum projection luminance value Emax does not exceed the By value of 10, to step S706.

In step S705, the control unit 101 decides, in accordance with the maximum projection luminance value Emax, a high-luminance subject luminance change value γ for changing the reference luminance value. In normal image sensing, it is preferable to sense a high-luminance subject to be brighter than an image sensing result at a correct exposure. In the digital camera 100 according to the embodiment, when a region having an average luminance exceeding the Bv value of 10 exists in the image sensing target, the control unit 101 sets the reference luminance value serving as an exposure setting decision criterion to be small. This makes bright the image sensing result of the high-luminance subject. In this step, the control unit 101 decides the high-luminance subject luminance change value γ for changing the reference luminance value to be small. More specifically, the control unit 101 decides the luminance change value γ as $$\gamma = (E_{max} - 10) \times 0.25$$

That is, the luminance change value γ is obtained by multiplying, by a predetermined coefficient, the difference between an average luminance exceeding a predetermined luminance value and the predetermined luminance value. Although the predetermined coefficient is set to 0.25 in the embodiment, this value may be changed to a value of the user's preference or an experimentally obtained value.

If the control unit 101 determines in step S704 that the maximum projection luminance value Emax does not exceed the By value of 10, it sets the high-luminance subject luminance change value γ to 0 in step S706.

In step S707, the control unit 101 decides exposure settings (exposure control values such as the shutter speed, aperture value, and sensitivity) for the image sensing target based on a final reference luminance value Ee obtained by adding the luminance change value to the weighted average luminance Ea calculated by weighted averaging in step S702. More specifically, the control unit 101 calculates the final reference luminance value Ee in accordance with:

$$E_e = E_a - \gamma$$

The control unit 101 decides the exposure settings for the reference luminance value Ee according to a predetermined exposure setting decision method, completing the exposure setting decision processing (in non-backlight).

After the exposure settings used when the image sensing instruction is issued are decided by executing the exposure setting decision processing, the control unit 101 shifts the process to step S606.

In step S606, the control unit 101 determines whether an image sensing instruction has been issued. More specifically, the control unit 101 determines the presence/absence of an image sensing instruction based on whether it has received, from the operation input unit 108, a control signal representing that the user has issued an image sensing instruction. If the control unit 101 determines that an image sensing instruction has been issued, it shifts the process to step S607; if it determines that no image sensing instruction has been issued, returns the process to step S601.

In step S607, the control unit 101 executes the image sensing sequence at the decided exposure settings, and controls the signal processing unit 102 to apply encoding processing of the recording file format to the obtained image. The control unit 101 records the obtained image data as an image file on the recording medium 105, completing the image sensing processing.

If the control unit 101 determines in step S604 that the backlight scene image sensing mode has been set, it executes exposure setting decision processing (in backlight) in step S608, and decides exposure settings used when an image sensing instruction is issued.

<Exposure Setting Decision Processing (in Backlight)>

Figure 8:
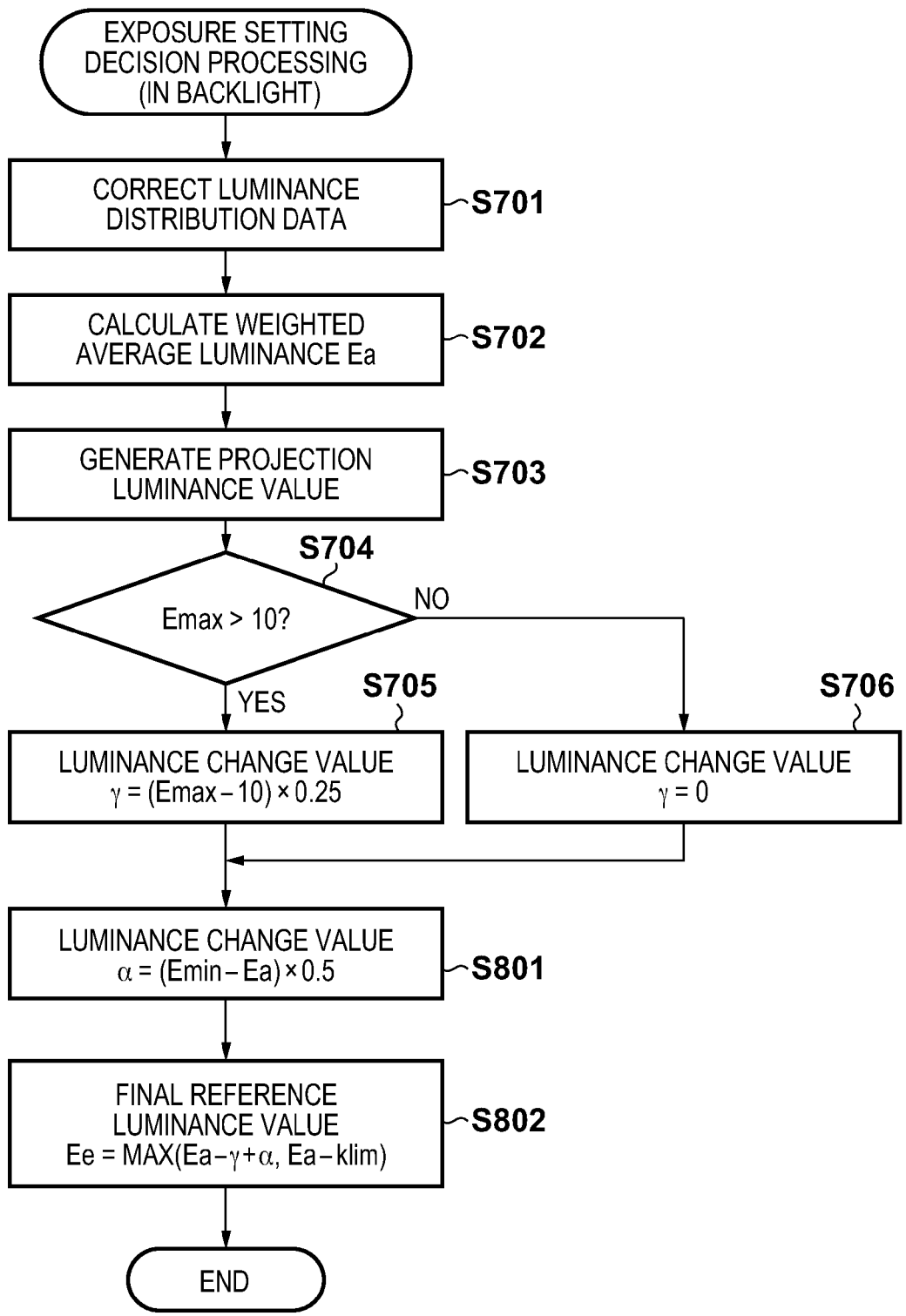
FIG. 8 is a flowchart exemplifying exposure setting decision processing (in backlight) to be executed by the digital camera 100 according to the embodiment of the present invention.

The exposure setting decision processing (in backlight) to be executed by the digital camera 100 according to the embodiment will be explained in detail with reference to the flowchart of FIG. 8. In the description of the exposure setting decision processing (in backlight), the same reference numerals as those in the above-described exposure setting decision processing (in non-backlight) denote the same steps, and a description thereof will not be repeated.

Upon completion of deciding the high-luminance subject luminance change value γ, the control unit 101 decides in step S801 a low-luminance subject luminance change value α for changing the reference luminance value in accordance with a minimum projection luminance value Emin (second average luminance value) among the projection luminance values generated in step S703.

When a subject of the user's choice is not selected as a main subject (a subject having a high degree of influence on exposure settings) owing to the composition, subject state, or the like in a backlight scene, a preferable image sensing result of the subject of the user's choice may not be output at exposure settings decided for the main subject. More specifically, at a weighted average luminance obtained for a subject selected as a main subject, a weighting value for the subject of the user's choice may be small, and the degree of influence of the luminance of the subject of the user's choice on the reference luminance value in exposure setting decision becomes low. That is, when the subject of the user's choice is not selected as a main subject, exposure settings decided based on the reference luminance value have not been decided in correspondence with the subject of the user's choice, so no preferable image sensing result can be obtained. Also, even if a plurality of images are sensed at different exposure amounts and combined by using the decided exposure settings as a reference, no preferable combined image can be obtained because suitable exposure settings are not used as a reference in the first place.

For example, a situation as in FIG. 10A in which an outdoor landscape 1002 and an indoor person 1001 are sensed indoors at the window, which is a typical example of a backlight scene, will be explained. At this time, to obtain an image sensing result at a correct exposure for the person 1001, the person 1001 is preferably selected as a main subject. In the composition shown in FIG. 10A, the person 1001 exists at a position slightly leftward from the center. When the luminance distribution data $ED_{11}$ to $ED_{79}$ of the image sensing range are those shown in FIG. 10B in the respective photometry areas, it is considered that a preferable reference luminance value is obtained from a weighting value distribution which gives heavy weights in $ED_{44}$, $ED_{45}$, and the like.

However, when a distribution weighted in the central region of the image sensing range by default, as shown in FIG. 9B, is used, the luminance value of the person 1001 present at a position shifted from the center is hardly reflected in calculation of the weighted average luminance. In the example of FIG. 10B, the central region of the image sensing range contains not only the person 1001 but also a window frame 1003 and the landscape 1002, and the luminance of the central region rises in accordance with that of the landscape 1002. In the weighting distribution of FIG. 9B, the weighted average luminance is 7.625. For example, in the backlight scene image sensing mode, assume that images of three types of tones at different exposure amounts are combined, and the exposure settings of the respective images are defined as exposure settings based on the weighted average luminance for an intermediate-exposure image exposure settings based on a luminance value obtained by subtracting "3" from the weighted average luminance for a high-exposure image exposure settings based on a luminance value obtained by adding "3" to the weighted average luminance for a low-exposure image At this time, a high-exposure image in which the exposure is suited to the low-luminance indoor person 1001 or the like is sensed at exposure settings decided using, as a reference luminance value:

$$7.625 - 3 = 4.625$$

However, in a strict sense, the exposure settings are different from those for setting the luminance value of 4.125 in $ED_{44}$ as a correct exposure.

In the embodiment, therefore, if the backlight scene image sensing mode is set, the control unit 101 changes the reference luminance value in exposure setting decision in accordance with the luminance value of a low-luminance region where the subject of the user's choice is highly likely to exist when a main subject is erroneously selected. That is, when the subject of the user's choice is not selected as a main subject, it is highly likely to exist in a region of a luminance lower than the weighted average luminance. Hence, the control unit 101 decides, according to the following equation, the low-luminance subject luminance change value α for changing the reference luminance value in accordance with the minimum projection luminance value Emin:

$$\alpha = (E_{min} - E_a) \times 0.5$$

That is, the luminance change value α is a value obtained by multiplying, by a predetermined coefficient, the difference between the minimum projection luminance value and the weighted average luminance. Although the predetermined coefficient is set to 0.5 in the embodiment, this value may be changed to a value of the user's preference or an experimentally obtained value.

In step S802, the control unit 101 decides exposure settings (exposure control values such as the shutter speed, aperture value, and sensitivity) for the image sensing target based on a final reference luminance value Ee obtained by adding the luminance change value to the weighted average luminance Ea calculated by weighted averaging in step S702. More specifically, the control unit 101 calculates the final reference luminance value Ee by using:

$$E_e = \text{MAX}(E_a - \gamma + \alpha, E_{max} - k_{lim})$$

where MAX( ) is a function of outputting a maximum value among listed numerical values. The maximum value function is set for the following reason.

Figures 10A, 10B:
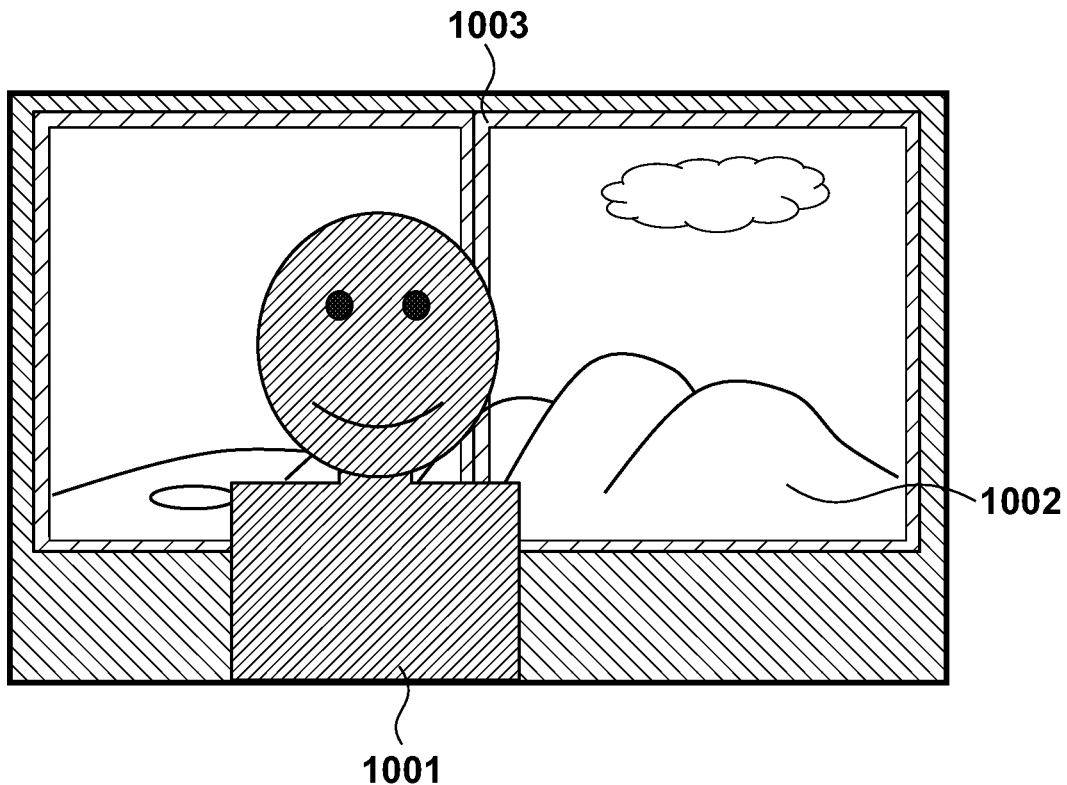
FIGS. 10A and 10B are views for explaining a problem when selection of a main subject fails.

A scene in which a strong light source or the like exists in the image sensing range and the brightness difference between high- and low-luminance portions is larger than that in a backlight scene shown in FIG. 10A will be examined though this is a very rare case. At this time, when the final reference luminance value Ee is calculated using the high-luminance subject luminance change value γ and the low-luminance subject luminance change value α, the high-luminance portion of even a low-exposure image using a highest shutter speed may be saturated to lose the tone. In calculation of the weighted average luminance value Ea, the weighted average luminance value rises in accordance with the luminance value of a high-luminance region including a light source or the like. Thus, the exposure time of a low-exposure image that is set based on the weighted average luminance value may become longer than that for a scene as shown in FIG. 10A.

To prevent the loss of the tone in a scene having a large brightness difference, the embodiment adopts, as the final reference luminance value Ee, a value obtained by subtracting a predetermined value $k_{lim}$ from the maximum projection luminance value Emax among projection luminance values. For example, the maximum projection luminance value Emax is considered to contain the highest-luminance portion of a scene. It is therefore only necessary to decide the final reference luminance value Ee for an intermediate-exposure image within a luminance value range which does not fall below the projection luminance value by five steps. With this setting, the tone of the high-luminance portion of a low-exposure image using a highest shutter speed almost certainly remains though blocked up shadows may be generated at the low-luminance portion. As for the $k_{lim}$ value, a value at which the tone of the high-luminance value reliably remains even in an image of a small exposure amount to be combined in a backlight scene is decided in consideration of the image sensing range of the digital camera 100, the change width of the exposure amount in a plurality of image sensing operations, and the like (for example, $k_{lim}=5$).

In most backlight scenes except for a scene having a large brightness difference as described above, the first argument ($E_\alpha-\gamma+\alpha$) of the above-described maximum value function becomes larger than the second argument ($E_{max}-k_{lim}$). To the contrary, in a scene having a large brightness difference, the second argument of the maximum value function becomes larger than the first argument. By setting the maximum value function in calculation of the final reference luminance value Ee in this step, a reference luminance value corresponding to an assumed backlight scene is output.

For example, in the scene of FIG. 10A, the minimum projection luminance value Emin is 5.25, so the low-luminance subject luminance change value α is −1.125, and ($E_\alpha-\gamma+\alpha$) is 6.5. In contrast, since the maximum projection luminance value Emax is 9.125, ($E_{max}-k_{lim}$) becomes 4.125 when $l_{lim}$ is 5. That is, 6.5 is selected as the final reference luminance value Ee. In this case, for a low-exposure image using a highest shutter speed, 6.5+3=9.5 is a reference luminance value in exposure setting decision, and exposure settings capable of image sensing can be decided without saturating a high-luminance portion such as an outdoor portion in the scene of FIG. 10A. For a high-exposure image using a lowest shutter speed, 6.5−3=3.5 becomes a reference luminance value in exposure setting decision, and exposure settings capable of bright image sensing can be decided without generating blocked up shadows at the indoor portion, especially the person 1001 in the scene of FIG. 10A.

As a result, exposure settings can be decided using the reference luminance value Ee considering the high-luminance subject luminance change value γ and the low-luminance subject luminance change value α. When the backlight scene image sensing mode is set, the digital camera 100 according to the embodiment senses and combines images of three types of tones in the above-described manner, generating a tone expression-enhanced image. The reference luminance value for the exposure settings of each image is also the same as that in the above-described example. That is, the control unit 101 decides the exposure settings of an intermediate-exposure image based on the reference luminance value Ee calculated in step S802, and the exposure settings of low- and high-exposure images based on luminance values larger and smaller by three steps from the reference luminance value Ee. In the embodiment, a combined image which enhances the tone expression is generated by combining three types of images obtained at different exposure amounts. However, it will be understood that the number of images to be combined and the combination method are not limited to them.

By executing the exposure setting decision processing, the control unit 101 decides exposure settings for the respective images of three types of tones to be sensed in the backlight scene image sensing mode when an image sensing instruction is issued. After that, the control unit 101 shifts the process to step S609.

In step S609, the control unit 101 determines whether an image sensing instruction has been issued. More specifically, the control unit 101 determines the presence/absence of an image sensing instruction based on whether it has received, from the operation input unit 108, a control signal representing that the user has issued an image sensing instruction. If the control unit 101 determines that an image sensing instruction has been issued, it shifts the process to step S610; if it determines that no image sensing instruction has been issued, returns the process to step S601.

In step S610, the control unit 101 executes the image sensing sequence at the exposure settings for a high-exposure image out of the decided exposure settings, and stores the obtained image in the VRAM 103.

In step S611, the control unit 101 executes the image sensing sequence at the exposure settings for an intermediate-exposure image out of the decided exposure settings, and stores the obtained image in the VRAM 103.

In step S612, the control unit 101 executes the image sensing sequence at the exposure settings for a low-exposure image out of the decided exposure settings, and stores the obtained image in the VRAM 103.

In step S613, the control unit 101 controls the signal processing unit 102 to generate a combined image from the images of three types of tones that have been stored in the VRAM 103. More specifically, the signal processing unit 102 performs tone mapping to associate the images of three types of tones with tone values, and then combines the images of three types of tones by using combination ratios as shown in FIG. 11. In FIG. 11, the ordinate represents the combination ratio, and the abscissa represents the lightness after tone mapping. FIG. 11 shows generation of a combined image by using a pixel of the high-exposure image for a pixel having a lightness equal to or lower than L1 combining pixels of the high- and intermediate-exposure images for a pixel having a lightness higher than L1 and equal to or lower than L2 using a pixel of the intermediate-exposure image for a pixel having a lightness higher than L2 and equal to or lower than L3 combining pixels of the intermediate- and low-exposure images for a pixel having a lightness higher than L3 and equal to or lower than L4 using a pixel of the low-exposure image for a pixel having a lightness higher than L4.

Accordingly, the signal processing unit 102 can generate a combined image having few pixels suffering blown out highlights or blocked up shadows even for a subject having a large luminance difference between image sensing targets, like a backlight scene.

The control unit 101 controls the signal processing unit 102 to apply encoding processing of the recording file format to the obtained combined image. The control unit 101 records the obtained image data as an image file on the recording medium 105, completing the image sensing processing.

In the embodiment, the projection luminance values of one-dimensional projections for each row and each column are generated from luminance data of the photometry sensor 26 in exposure setting decision processing. However, the practice of the present invention is not limited to this. That is, a luminance value to be referred to when changing the reference luminance value in exposure setting decision may be the average luminance of a region of a predetermined size contained in an image sensing target, and the size and shape of the region are not limited to the above-described ones. For example, the average luminance value (block division luminance value) of 3×3 regions $Z_1$ to $Z_9$ of the divided photometry areas as shown in FIG. 12:

$Z_1$: 3×3 regions centered on $PD_{22}$
$Z_2$: 3×3 regions centered on $PD_{25}$
$Z_3$: 3×3 regions centered on $PD_{28}$
$Z_4$: 3×3 regions centered on $PD_{42}$
$Z_5$: 3×3 regions centered on $PD_{45}$
$Z_6$: 3×3 regions centered on $PD_{48}$
$Z_7$: 3×3 regions centered on $PD_{62}$
$Z_8$: 3×3 regions centered on $PD_{65}$
$Z_9$: 3×3 regions centered on $PD_{68}$ may be referred to when changing the reference luminance value in exposure setting decision. In this way, exposure settings are made (exposure control values are decided) based on the photometric values of a plurality of photometry regions smaller in number than photometry regions used in weighting computation.

In the embodiment, by changing a weighting value for a region corresponding to an in-focus subject in a predetermined weighting value distribution, the weighting value distribution which puts weight on at least the in-focus subject is used to calculate a reference luminance value. However, the present invention suffices to decide exposure settings at which a subject of the user's choice is correctly exposed when the subject of the user's choice is not selected as a main subject (a preferential subject at exposure settings) owing to the composition or the like. The weight used to calculate a reference luminance value is not limited to the above one.

For example, the weighting distribution may be generated as follows in a method of selecting an in-focus subject as a main subject without determining a weighting value distribution which gives priority to a luminance value in the central region of the image sensing range, as described above. First, the control unit 101 decides the weighting values w(x, y) of corresponding areas based on defocus amounts obtained for the distance measurement areas $S_{01}$ to $S_{09}$. At this time, the weighting value is increased for an in-focus area. As for areas not corresponding to the distance measurement areas, the control unit 101 may generate weighting values by interpolating the weighting values decided for the areas corresponding to the distance measurement areas.

Alternatively, the control unit 101 may decide a region containing a main subject in the image sensing range in accordance with, for example, a preset main subject decision method, and generate a weighting value distribution which puts weight on the region.

In the embodiment, in exposure setting decision when the backlight scene image sensing mode is set, the reference luminance value is obtained by subtracting the absolute values of the high-luminance subject luminance change value $\gamma$ and low-luminance subject luminance change value $\alpha$ from the weighted average luminance Ea. However, the practice of the present invention is not limited to this, and only the absolute value of the low-luminance subject luminance change value $\alpha$ may be subtracted from the weighted average luminance Ea. It is also possible to determine the magnitude relationship between the luminance change values $\alpha$ and $\gamma$, and subtract only the absolute value of either luminance change value having a larger absolute value from the weighted average luminance Ea.

In the embodiment, whether the image sensing target is a backlight scene is determined based on whether the current scene setting is the backlight scene image sensing mode. However, it will be readily understood that the backlight scene determination method is not limited to this. That is, whether the image sensing target is a backlight scene can be determined by an obtained luminance distribution, a known scene discrimination technique, or the like.

As described above, the image sensing apparatus according to the embodiment performs exposure control to preferably expose a main subject in backlight. More specifically, the image sensing apparatus obtains, from an obtained image sensing target luminance distribution, the weighted average luminance of an image sensing target that puts weight on a main subject. The image sensing apparatus changes the weighted average luminance in accordance with the difference between the average luminance of a region that is lower than the weighted average luminance, out of regions each of a predetermined size contained in the image sensing target, and the weighted average luminance. The image sensing apparatus decides exposure control values based on the changed luminance.

With this setting, even if a subject of the user's choice is not selected as a main subject in a backlight scene, the image sensing apparatus can sense an image in which the subject is preferably exposed.

Instead of deciding exposure control values by subtracting the absolute value of the luminance change value from the weighted average luminance, exposure control values decided based on the weighted average luminance may be changed using a correction value equivalent to the above-described luminance change value, thereby deciding final exposure control values.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-084066, filed Apr. 2, 2012, which is hereby incorporated by reference herein in its entirety.

What is claimed is:

1. An image sensing apparatus comprising:
   an obtaining unit configured to obtain information about a luminance distribution of an image sensing target;
   a weighted average unit configured to obtain a weighted average luminance of the image sensing target, that puts weight on a main subject, from the information about the luminance distribution of the image sensing target obtained by said obtaining unit; and a decision unit configured to decide an exposure control value based on an average luminance of a region that is lower than the weighted average luminance, out of regions each of a predetermined size contained in the image sensing target, and the weighted average luminance, wherein said decision unit decides the exposure control value based on the average luminance of the region having a lowest average luminance, out of the regions each of the predetermined size contained in the image sensing target, and the weighted average luminance.

2. The apparatus according to claim 1, wherein an average luminance of a region of the predetermined size contained in the image sensing target is a luminance value obtained by one-dimensionally projecting the luminance distribution of the image sensing target.

3. An image sensing apparatus comprising:

an obtaining unit configured to obtain information about a luminance distribution of an image sensing target;

a weighted average unit configured to obtain a weighted average luminance of the image sensing target, that puts weight on a main subject, from the information about the luminance distribution of the image sensing target obtained by said obtaining unit;

a decision unit configured to decide an exposure control value based on an average luminance of a region that is lower than the weighted average luminance, out of regions each of a predetermined size contained in the image sensing target, and the weighted average luminance; and a determination unit configured to determine whether the image sensing target is a backlight scene, wherein, when said determination unit determines that the image sensing target is a backlight scene, said decision unit decides the exposure control value based on the average luminance of the region that is lower than the weighted average luminance, and the weighted average luminance.

4. The apparatus according to claim 3, wherein in accordance with the luminance distribution of the image sensing target or a scene setting in the image sensing apparatus, said determination unit determines whether the image sensing target is a backlight scene.

5. The apparatus according to claim 3, wherein said decision unit decides the exposure control value further based on an average luminance of a region that is higher than a predetermined luminance, out of the regions each of the predetermined size contained in the image sensing target.

6. The apparatus according to claim 5, wherein said decision unit decides the exposure control value based on a difference between the average luminance of the region that is higher than the predetermined luminance, and the predetermined luminance.

7. The apparatus according to claim 6, wherein said decision unit changes the weighted average luminance in accordance with a difference between the average luminance of the region that is higher than the predetermined luminance, and the predetermined luminance, and decides the exposure control value based on the changed weighted average luminance.

8. The apparatus according to claim 3, wherein said decision unit decides the exposure control value based on a difference between the average luminance of the region that is lower than the weighted average luminance, and the weighted average luminance.

9. The apparatus according to claim 8, wherein said decision unit changes the weighted average luminance in accordance with a difference between the average luminance of the region that is lower than the weighted average luminance, and the weighted average luminance, and decides the exposure control value based on the changed weighted average luminance.

10. The apparatus according to claim 9, wherein said decision unit decides the exposure control value based on a luminance obtained by adding, to the weighted average luminance, a value obtained by multiplying, by a predetermined coefficient, a difference between the average luminance of the region that is lower than the weighted average luminance, and the weighted average luminance.

11. An image sensing apparatus comprising:

an obtaining unit configured to obtain information about a luminance distribution of an image sensing target;

a first calculation unit configured to calculate a first average luminance value by performing weighting computation using a larger weight for a region of interest than a weight for another region in the luminance distribution of the image sensing target obtained by said obtaining unit;

a second calculation unit configured to calculate an average luminance value of a region which is larger than the region of interest and smaller than a region used in the weighting computation; and a decision unit configured to decide an exposure control value based on a difference between a second average luminance value which is calculated by said second calculation unit and is smaller than the first average luminance value, and the first average luminance value.

12. The apparatus according to claim 11, wherein said decision unit decides the exposure control value based on a luminance value which is calculated based on the difference between the first average luminance value and the second average luminance value and is smaller than the first average luminance value.

13. The apparatus according to claim 11, further comprising a determination unit configured to determine whether the image sensing target is a backlight scene, wherein when said determination unit determines that the image sensing target is a backlight scene, said decision unit decides the exposure control value based on the difference between the first average luminance value and the second average luminance value.

14. The apparatus according to claim 13, wherein when said determination unit determines that the image sensing target is not a backlight scene, said decision unit decides the exposure control value based on the first average luminance value without using the second average luminance value.

15. The apparatus according to claim 11, further comprising an image combination unit configured to combine a plurality of images, wherein said decision unit decides, by using, as a reference, the exposure control value decided based on the first average luminance value and the second average luminance value, a plurality of exposure control values when obtaining a plurality of images used in combination by said image combination unit.

16. An exposure control method comprising:

an obtaining step of causing an obtaining unit to obtain information about a luminance distribution of an image sensing target;

a first calculation step of causing a computation unit to calculate a first average luminance value by performing weighting computation using a larger weight for a region of interest than a weight for another region in the luminance distribution of the image sensing target obtained in the obtaining step;

a second calculation step of calculating an average luminance value of a region which is larger than the region of interest and smaller than a region used in the weighting computation; and a decision step of deciding an exposure control value based on a difference between a second average luminance value which is calculated in the second calculation step and is smaller than the first average luminance value, and the first average luminance value, wherein, in decision step, the exposure control value is decided based on the average luminance of the region having a lowest average luminance, out of the regions each of the predetermined size contained in the image sensing target, and the weighted average luminance.

17. A non-transitory computer-readable recording medium recording a program for causing a computer to execute an exposure control method defined in claim 16.

18. An exposure control method comprising:

an obtaining step of causing an obtaining unit to obtain information about a luminance distribution of an image sensing target;

a first calculation step of causing a computation unit to calculate a first average luminance value by performing weighting computation using a larger weight for a region of interest than a weight for another region in the luminance distribution of the image sensing target obtained in the obtaining step;

a second calculation step of calculating an average luminance value of a region which is larger than the region of interest and smaller than a region used in the weighting computation; and a decision step of deciding an exposure control value based on a difference between a second average luminance value which is calculated in the second calculation step and is smaller than the first average luminance value, and the first average luminance value; and a determination step of determining whether the image sensing target is a backlight scene, wherein, when it is determined that the image sensing target is a backlight scene in the determination step, the exposure control value is decided, in the decision step, based on the average luminance of the region that is lower than the weighted average luminance, and the weighted average luminance.

19. A non-transitory computer-readable recording medium recording a program for causing a computer to execute an exposure control method defined in claim 18.

* * * * *